United States Patent
Antonopoulos et al.

(10) Patent No.: US 12,493,532 B2
(45) Date of Patent: Dec. 9, 2025

(54) SYSTEM AND METHOD FOR DATABASE RECOVERY FOR ENCRYPTED INDEXES

(71) Applicant: Microsoft Technology Licensing, LLC, Redmond, WA (US)

(72) Inventors: Panagiotis Antonopoulos, Redmond, WA (US); Arvind Arasu, Redmond, WA (US); Nitish Gupta, Seattle, WA (US); Rajat Jain, Redmond, WA (US); Raghav Kaushik, Kirkland, WA (US); Hanumantha R. Kodavalla, Sammamish, WA (US); Nikolas Ogg, Seattle, WA (US); Ravishankar Ramamurthy, Redmond, WA (US); Kunal Deep Singh, Seattle, WA (US); Jakub Szymaszek, Issaquah, WA (US); Jeffrey Michael Trimmer, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1731 days.

(21) Appl. No.: 16/692,671

(22) Filed: Nov. 22, 2019

(65) Prior Publication Data
US 2021/0157682 A1 May 27, 2021

(51) Int. Cl.
*G06F 11/14* (2006.01)
*G06F 16/23* (2019.01)
(Continued)

(52) U.S. Cl.
CPC ...... *G06F 11/1469* (2013.01); *G06F 16/2379* (2019.01); *G06F 16/245* (2019.01);
(Continued)

(58) Field of Classification Search
CPC ............. G06F 11/1469; G06F 16/2379; G06F 16/245; G06F 9/45558; G06F 21/602;
(Continued)

(56) References Cited

U.S. PATENT DOCUMENTS 8,639,947 B2 * 1/2014 Elovici ..................... H04L 9/14
705/52
10,127,391 B1 * 11/2018 Whitmer ............... G06F 21/602
(Continued)

*Primary Examiner* — Rupal Dharia
*Assistant Examiner* — Devin E Almeida
(74) *Attorney, Agent, or Firm* — Weaver IP L.L.C.

(57) ABSTRACT

Methods for database recovery for encrypted indexes are performed by systems and devices. A query with a decryption key is received from a client device, where the query modifies an encrypted index of a database using a secure enclave. When events requiring remedial actions for the database occur during the querying, some transactions of the query and later queries are deferred, and a remedial action is initiated that includes restarting the database. A determination of the remedial action being unsuccessful in recovering the encrypted index causes the action to be re-performed until another query having the decryption key is received whereupon the action is performed again to recover the encrypted index utilizing the decryption key. Deferred transactions are then performed with the decryption key. When a database restarts for access without secure enclaves, the encrypted index for the database is invalidated, and the remedial actions are otherwise completed or discarded.

20 Claims, 6 Drawing Sheets

(51) Int. Cl.
    *G06F 16/245* (2019.01)
    *G06F 21/60* (2013.01)
    *G06F 21/62* (2013.01)
    *G06F 9/455* (2018.01)

(52) U.S. Cl.
    CPC ........ G06F 21/602 (2013.01); G06F 21/6227 (2013.01); *G06F 9/45558* (2013.01); *G06F 2009/45587* (2013.01); *G06F 2201/80* (2013.01)

(58) Field of Classification Search
    CPC ....... G06F 21/6227; G06F 2009/45587; G06F 2201/80
    See application file for complete search history.

(56) References Cited

U.S. PATENT DOCUMENTS

| | | | |
|---|---|---|---|
| 11,392,714 B1* | 7/2022 | Matthews | H04L 9/083 |
| 2005/0004924 A1* | 1/2005 | Baldwin | G06F 16/2246 |
| 2006/0085651 A1* | 4/2006 | Staddon | H04L 9/3218 |
| | | | 713/193 |
| 2014/0090081 A1* | 3/2014 | Mattsson | G06F 21/6218 |
| | | | 726/27 |
| 2014/0095889 A1* | 4/2014 | Araki | H04L 9/0894 |
| | | | 713/189 |
| 2015/0143112 A1* | 5/2015 | Yavuz | G06F 21/6227 |
| | | | 713/165 |
| 2015/0186187 A1* | 7/2015 | Weisberg | G06F 9/5083 |
| | | | 707/747 |
| 2015/0379295 A1* | 12/2015 | Branton | G06F 21/6218 |
| | | | 713/165 |
| 2016/0330180 A1* | 11/2016 | Egorov | G09C 1/00 |
| 2017/0061151 A1* | 3/2017 | Baessler | G06F 16/3331 |
| 2017/0103217 A1* | 4/2017 | Arasu | H04L 9/0819 |
| 2019/0087600 A1* | 3/2019 | Sion | H04L 63/10 |
| 2020/0241968 A1* | 7/2020 | Thomsen | G06F 11/1471 |
| 2021/0081562 A1* | 3/2021 | Hirano | H04L 9/06 |
| 2021/0089401 A1* | 3/2021 | Park | G06F 16/2246 |
| 2021/0224242 A1* | 7/2021 | Hardy-Francis | G06F 16/901 |

* cited by examiner

SYSTEM AND METHOD FOR DATABASE RECOVERY FOR ENCRYPTED INDEXES

BACKGROUND

Adding indexes to encrypted columns of a database can lead to recovery issues. If an instance of a database server/host fails, its databases may be left in a state where the data files may contain some modifications from incomplete transactions. When the instance is restarted, a database recovery is run, which involves rolling back incomplete transactions found in the transaction log of the database to ensure the integrity of the database is preserved. When an incomplete transaction made any changes to an index, those changes also need to be undone because key values in the index may need to be removed or reinserted. This recovery process has to have the decryption keys present in the enclave to complete recovery of transactions modifying an encrypted index. However, a user may not connect to the database server/host during the recovery process, denying access to the decryption keys by the enclave, and thus the database server/host is unable to make the database available for users to access.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for database recovery for encrypted indexes are performed by systems and devices. A user may submit a query for a database using a secure enclave from a client device, where the query includes a decryption key. The performance of the query modifies an encrypted index of the database using the decryption key. If events requiring remedial actions to be performed for the database occur during the performance of the query, some transactions of the query that modify the encrypted index, and/or transactions of later queries, are deferred. A remedial action is then initiated that includes restarting the database, which may be performed using a secure enclave or without a secure enclave. After restarting the database, a determination that the remedial action was unsuccessful in recovering the encrypted index causes the remedial action to be re-performed until a further query having the decryption key is received. On receiving the further query, the remedial action is performed again using the decryption key to recover the encrypted index. Deferred transactions are then performed with the decryption key from the further query. When a database that was using a secure enclave is restarted without a secure enclave, the encrypted index for the database is invalidated, and remedial actions are otherwise completed or discarded.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
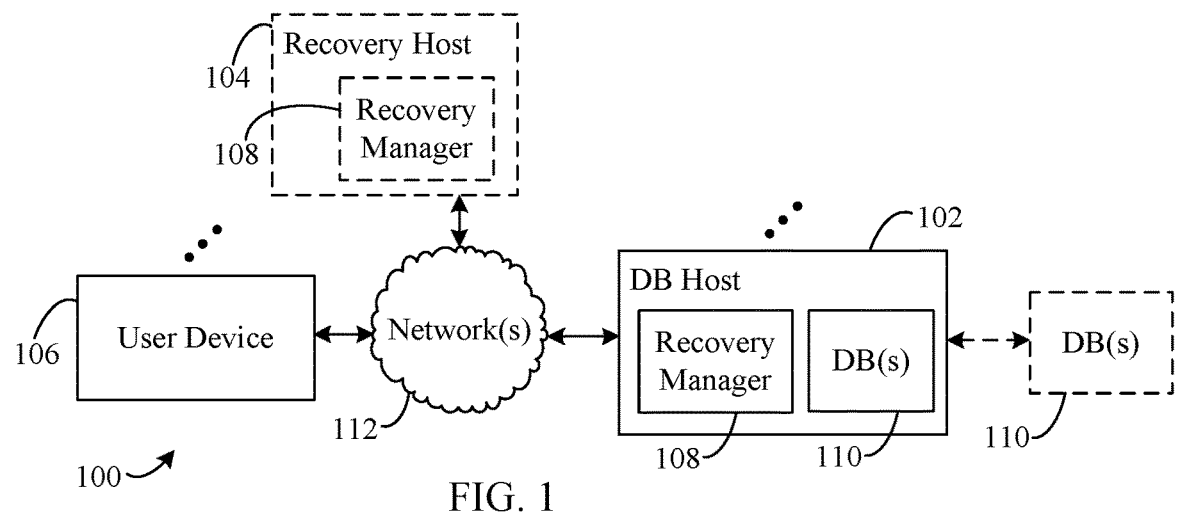
FIG. 1 shows a block diagram of a networked system for database recovery for encrypted indexes, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for database recovery for encrypted indexes. Section III below describes example computing device embodiments that may be used to implement features of the embodiments described herein. Section IV below describes additional examples and advantages, and Section V provides some concluding remarks.

II. Example Embodiments for Database Recovery for Encrypted Indexes

Methods for database recovery for encrypted indexes are performed by systems and devices. Embodiments herein may be directed to databases and/or portions thereof associated with secure enclaves for handling of sensitive and/or encrypted information. For example, a user may issue a query with a decryption key from a client device. When received and executed by a database host, the query may modify an encrypted index of a database using a secure enclave. When a determination is made by a recovery manager that events requiring remedial actions for the database have occurred during the performance of the query, transactions of the query that modify the encrypted index may be deferred, and a remedial action is initiated to restart and/or repair the database and the encrypted index. However, scenarios may exist in which a secure enclave may not have the decryption key when the database is restarted, e.g., another query with the decryption key has not been provided, and this may prevent other users from accessing the encrypted index. Additionally, the database may be restarted in, or backed up to, a host that does not have secure enclaves, thus preventing recovery of the encrypted index which may only be processed in a secure enclave.

If the recovery manager determines that the remedial action was unsuccessful in recovering the encrypted index, the recovery manager may perform the remedial action one or more additional times, e.g., in the background, until a further query having the decryption key is received. When the further query is received, the remedial action is performed again to recover the encrypted index utilizing the decryption key from the further query. Deferred transactions may then be performed with the decryption key which will allow access in the secure enclave to properly modify the encrypted index. When databases initially running in association with secure enclaves are restarted for access without secure enclaves, the encrypted index for the database may be invalidated, and the remedial actions are otherwise completed for tables in the database.

These and other embodiments for database recovery for encrypted indexes are described below.

In the context of at least some embodiments, databases may store tables or columns of sensitive, personal, and/or identifying information that encrypted in the database based on an encryption key of a user or owner of the information (e.g., birthdays, social security numbers, account numbers, passwords, etc.). Such data or information may be stored in the database in an encrypted state that is not decipherable without the decryption key associated with the encryption. In embodiments, the data or information may be stored in the database as "always encrypted" entries, e.g., for SQL (Structured Query Language) Server®, although equivalent encryption mechanisms and/or database server types are also contemplated herein. To access the encrypted data according to current solutions, a user provides from a client device a query with an encrypted value for the data, and the database host provides the relevant table to be searched for the value to a secure enclave. A session with the secure enclave is then established for the client device via which the user may provide the decryption key from the client device to the secure enclave, whereupon the table is checked for entries corresponding to the value using the decryption key. The database host is then able to provide to the client device a result of the query for which entries in the table have the value.

As referred to herein, a "secure enclave" (or "enclave") is a protected region of memory within a database server process, and acts as a trusted execution environment for processing sensitive data inside the database server engine. A secure enclave appears as a "black box" to the rest of the database server and other processes on the database host. That is, secure enclaves prevent the viewing of any data or code inside the secure enclave from the outside, even with a debugger. Additionally, in this description, the term "secure enclave" is intended to include all equivalent structures and/or mechanisms that provide the same or similar functionality for data processing, in embodiments, including but without limitation, processing of encrypted data/indexes for query transactions.

However, issues may arise when the database indexes are also encrypted, or include encrypted values, due to the sensitive nature of the data and information stored in the database, e.g., some data or information is designated as always encrypted. As a non-limiting example, an issue such as a crash or other service interruption with the database may occur when a query being performed modifies the encrypted index. That is, when the database is restarted or restored, the decryption key may not be present in or available to the secure enclave, and while the database instance maintained by the database host can be recovered or rolled back to its previous state with encrypted data, the encrypted index may not be accessed in such a way when query operations/transactions affecting the encrypted index do not complete. In these cases, the decryption key is needed to repair the index using the secure enclave, and access to the encrypted index for other users may be blocked or impeded.

The embodiments herein provide for solutions to these issues by deferring transactions of queries that modify encrypted indexes while allowing recovery of, and then access to, the database while waiting for another query with the decryption key in order to recover the encrypted indexes and complete the deferred transactions, as exemplarily noted above.

Another issue that may arise occurs when a database is restarted or recovered from a secure enclave implementation with encrypted indexes to an implementation without a secure enclave. In these cases, the embodiments herein provide for invalidating the encrypted index of the database, discarding any deferred transactions or completing deferred transactions without the encrypted index, deleting the invalidated index, and/or completing remedial actions for the database. In embodiments, the encrypted index may be marked as invalid, such that rebuilding of the encrypted index is required if the encrypted index is desired for use later.

Accordingly, database recovery for encrypted indexes, e.g., used with secure enclaves, provides for improved and flexible database and index recovery in which users are enabled to access a recovered database while deferred transactions are queued and remedial actions are attempted in the background while waiting for later queries having decryption keys for encrypted index recovery. Additionally, the recovery of databases into spaces without secure enclaves may be performed without impeding access to the databases or issues with unrecovered encrypted indexes associated with the database.

These and other embodiments will be described in further detail below in association with the Figures, and in the Sections/Subsections that follow.

Systems, devices, and apparatuses may be configured in various ways to perform database recovery for encrypted indexes. For instance, FIG. 1 is a block diagram of a networked system 100, according to embodiments. System 100 is configured to perform database recovery for encrypted indexes, e.g., in implementations with secure enclaves, according to embodiments. As shown in FIG. 1, system 100 includes a database (DB) host 102 and a user device 106. In embodiments, service host 102 and user device 106 may communicate with each other over a network 112. It should be noted that various numbers of DB host devices and/or user devices may be present in various embodiments. Additionally, any combination of the components illustrated in FIG. 1 may be present in system 100, according to embodiments.

In some embodiments, a recovery host 104 may be included in system 100 that is physically and/or logically remote to, but associated with, DB host 102. Recovery host 104, when implemented separately, may include a recovery manager 108 and may perform operations and functions thereof, as described herein. Additionally, recovery host 104 may communicate over network 112.

As noted above, DB host 102, recovery host 104, and/or user device 106 may be communicatively coupled via network 112. Network 112 may comprise any type of communication links that connect computing devices and servers such as, but not limited to, the Internet, wired or wireless networks and portions thereof, point-to-point connections, local area networks, enterprise networks, and/or the like.

One or both of DB host 102 and recovery host 104 may comprise one or more server computers or computing devices, which may include one or more distributed or "cloud-based" servers. In embodiments, one or both of DB host 102 and recovery host 104 may be associated with, or may be a part of, a cloud-based service platform such as Microsoft® Azure® from Microsoft Corporation of Redmond, Wash., and in some embodiments one or both of DB host 102 and recovery host 104 may comprise an on-premises server(s) in addition to, or in lieu of, cloud-based servers. Various systems/devices herein, such as DB host 102 and/or recovery host 104, may be configured to receive database queries, data, and/or information, including existing decryption keys, etc., from user devices such as user device 106 via network 112. DB host 102 and/or recovery host 104 may be configured to perform database recovery for encrypted indexes, according to embodiments.

As illustrated, DB host 102 includes a recovery manager 108 that may be configured to perform database recovery for encrypted indexes, as described herein, e.g., in implementations with secure enclaves, and one or more databases shown as DB(s) 110 that store, or are configured to store, data that may include always-encrypted data. DB(s) 110 may reside external to DB host 102, in some embodiments. Recovery manager 108 may be configured as a service, in embodiments, or as an integrated portion of DB host 102 and/or a database server application thereof. DB host 102 may receive queries for data and/or always-encrypted data in DB(s) 110 via network 112 from user device 106.

It should be noted that as described herein, DB host 102 and/or recovery host 104, may be applicable to any type of system for performance of operations, including database recovery for encrypted indexes, according to embodiments. One example of implementations noted above are network, or "cloud," implementations, applications, or services in a network architecture/platform. A cloud platform may include a networked set of computing resources, including servers, routers, etc., that are configurable, shareable, provide data security, and are accessible over a network such as the Internet. Cloud applications/services such as recovery managers for database recovery for encrypted indexes, virtual machines for calls to secure enclaves, etc., may run on these computing resources, often atop operating systems that run on the resources, for entities that access the applications/services, locally and/or over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

User device 106 may be any number, type, or combination of computing devices or computing systems, including a terminal, a personal computer, a laptop computer, a tablet device, a smart phone, a personal digital assistant, a server(s), a wearable device (e.g., a smart watch), a gaming console, and/or the like, including internal/external storage devices, that may be utilized to provide queries for databases and/or decryption keys for encrypted/always-encrypted data therein, e.g., data that is processed in secure enclaves. In embodiments, user device 106 may be used by various types of users, including without limitation, end users such as end users of user device 106, software application end users, operating system end users, etc., that desire access to data stored in databases. User device 106 may also include additional components (not shown for brevity and illustrative clarity) including, but not limited to, components and subcomponents of other devices and/or systems herein, as well as those described below with respect to FIG. 11, such as but not limited to, an operating system, user interfaces (UIs), input and output devices, and/or the like.

Host devices/systems such as DB host 102 and/or recovery host 104 may be configured in various ways to perform database recovery for encrypted indexes. For instance, referring now to FIG. 2, a block diagram of a system 200 is shown for performing database recovery for encrypted indexes, according to an example embodiment. System 200 may be an embodiment of system 100 of FIG. 1, e.g., DB host 102 and/or recovery host 104. System 200 is described as follows.

Figure 2:
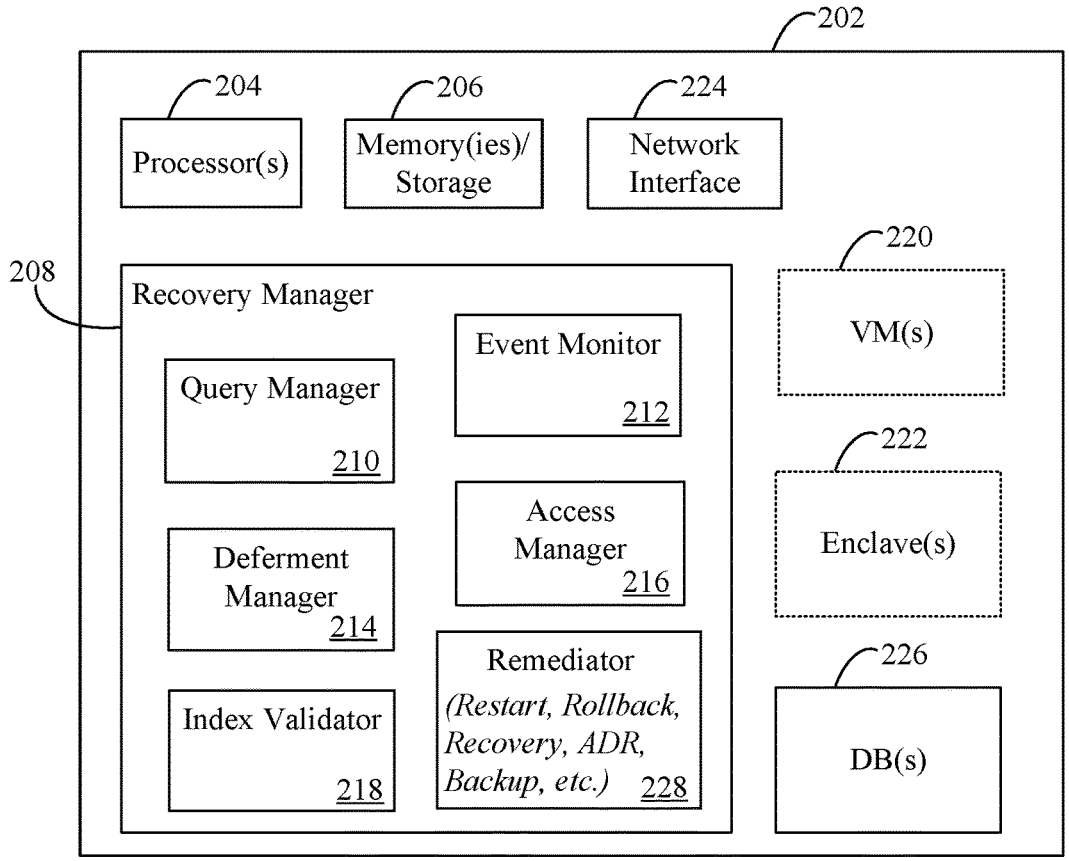
FIG. 2 shows a block diagram of a computing system configured for database recovery for encrypted indexes, according to an example embodiment.

System 200 includes a computing device 202, which may be an embodiment of DB host 102 (or recovery host 104) of FIG. 1, and which may be any type of server or computing device, including "cloud" implementations, as mentioned elsewhere herein, or as otherwise known. As shown in FIG. 2, computing device 202 may include one or more processors ("processor") 204, one or more of a memory and/or other physical storage device ("memory") 206, as well as one or more network interfaces ("network interface") 224. Computing device 202 includes a recovery manager ("manager") 208 that may be an embodiment of recovery manager 108 of FIG. 1. Recovery manager 208 may be configured to perform database recovery for encrypted indexes, as described herein, and in embodiments may comprise a portion of a DB server application/service. Computing device 202 may also include or be configured to execute one or more virtual machine instances (VMs) 220, one or more enclaves 226, and/or one or more databases (DBs) 226.

System 200 may also include additional components (not shown for brevity and illustrative clarity) including, but not limited to, components and subcomponents of other devices and/or systems herein, as well as those described below with respect to FIG. 11, such as an operating system, etc.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories (e.g., at least one cache for query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of recovery manager 208, including one or more of the components thereof as described herein, which may be implemented as computer program instructions for database recovery for encrypted indexes, etc., as described herein.

Memory 206 may store retrieved or received ones of, and/or portions of, existing DBs of DBs 226 for processing, in embodiments, and may be configured to for execution of one or more of VMs 220 and/or for implementations of one or more enclave(s) 222. Memory 206 may store or be configured to store computer program instructions/code as described herein, as well as to store other information and data described in this disclosure including, without limitation, user queries, indexes, encrypted indexes, decryption keys, DB logs, lists of completed/uncompleted transactions of queries, and/or the like.

Network interface 224 may be any type or number of wired and/or wireless network adapter, modem, etc., configured to enable system 200, including computing device 202, to communicate with other devices and/or systems over a network, such as communications between computing device 202 and other devices, systems, hosts, of system 100 in FIG. 1 over a network such as network 112.

VMs 220 may be configured to be executed specific to any OS of computing device 202 to execute query processing, according to embodiments, e.g., processing of tables, columns, etc., for queries in secure enclaves of enclave(s) 222 with encrypted indexes that are accessed using decryption keys. VMs 220 may utilize one or more of processor(s) 204 and/or memory 206, and may be instances of virtual machines that are initialized and/or terminated as required for DB processing, calls/transactions for queries, etc. That is, at any given time, based on the accesses to DB(s) 226 and/or usage of DB(s) 226, zero or more of VMs 220 may be present and executing for system 200.

Enclave(s) 222 may comprise secure regions of memory 206, as would understood by those of skill in the relevant art(s) having the benefit of this disclosure, that require a decryption key for access thereto. For example, an encrypted index and always-encrypted data of a DB may be provided to a secure enclave of enclave(s) 222 in which processing of the encrypted data and/or the encrypted index may be performed using a decryption key and in a manner that is not visible outside the secure enclave. As similarly described for VMs 220, zero or more secure enclave instances of enclave(s) 222 may be allocated/utilized in memory 206 for accessing/querying encrypted data and/or encrypted indexes. In some scenarios, embodiments of DB hosts for DB(s) 226 may not use or support enclave(s) 222, as described below.

DB(s) 226 may include one or more databases, of any type, that may include any type of data. In some embodiments, DB(s) 226 may be stored at memory/storage 206, or may be stored external to computing device 202, as similarly shown for the external embodiment of DB(s) 110 in FIG. 1. DB(s) 226 may be associated with a database server application, e.g., SQL Server®, but are not to be considered so limited. One or more of DB(s) 226 may include encrypted data, e.g., always-encrypted data, and such encrypted data may be associated with one or more encrypted indexes. Encrypted data and/or encrypted indexes may require a decryption key for access thereto and operations thereon, e.g., queries having transactions that modify the data and/or indexes, using a secure enclave of enclave(s) 222.

Recovery manager 208 of computing device 202 may include a plurality of components for performing the functions and operations described herein for database recovery for encrypted indexes, and may be configured to perform remedial actions. For instance, recovery manager 208 may be configured to receive queries for ones of DB(s) 226 to access encrypted information and modify encrypted indexes, determine crashes or other issues with the accessed DB, and take actions to recover DB information and/or encrypted indexes based on deferred actions and/or index invalidations. As noted above, queries may be received from a user device such as user device 106 of FIG. 1, or may be received from any other type of computing device configured to communicate with computing device 202 over a network to access DB(s) 226. As illustrated, recovery manager 208 includes a query manager 210, an event monitor 212, a deferment manager 214, an access manager 216, an index validator 218, and a remediator 228.

Query manager 210 is configured to receive queries from user devices. The queries may be directed to encrypted data in DB(s) 226, and the queries when executed may perform transactions that modify an encrypted index associated with the encrypted data that is queried. In embodiments, query manager 210 may comprise a portion of a DB server application/service that is logically outside of recovery manager 208, but is exemplarily shown in system 200 with recovery manager 208 for illustration. Event monitor 212 is configured to monitor for, and determine, events that occur which disrupt query transactions and require some form of remedial action to be taken to recover data in a DB and/or an index of the data.

Deferment manager 214 is configured to defer transactions that were not able to complete, or that did not complete properly, due to events determined by event monitor 212, including transactions that involve modification of an encrypted index. In embodiments, deferred transactions may be later queued by deferment manager 214 for completion when remedial actions are performed and a required decryption key is provided. Access manager 216 is configured to enable and/or disable access to noes of DB(s) 226 in association with the performance of remedial actions, and index validator 218 is configured to mark encrypted indexes and valid and/or invalid based on their recovery status. Remediator 228 is configured to perform one or more remedial actions, including but not limited to, any combination of accelerated database recovery (ADR), restart, rollback, other recovery actions, backup, and/or the like.

While shown separately for illustrative clarity, in embodiments, one or more of the components of recovery manager 208 may be combined together and/or as a part of other components of system 200. In some embodiments, less than all of the components of recovery manager 208 illustrated in FIG. 2 may be included. In software implementations, one or more components of recovery manager 208 may be stored in memory 206, and may be executed by processor 204. Further details regarding recovery manager 208 and its subcomponents are described below.

Figure 3:
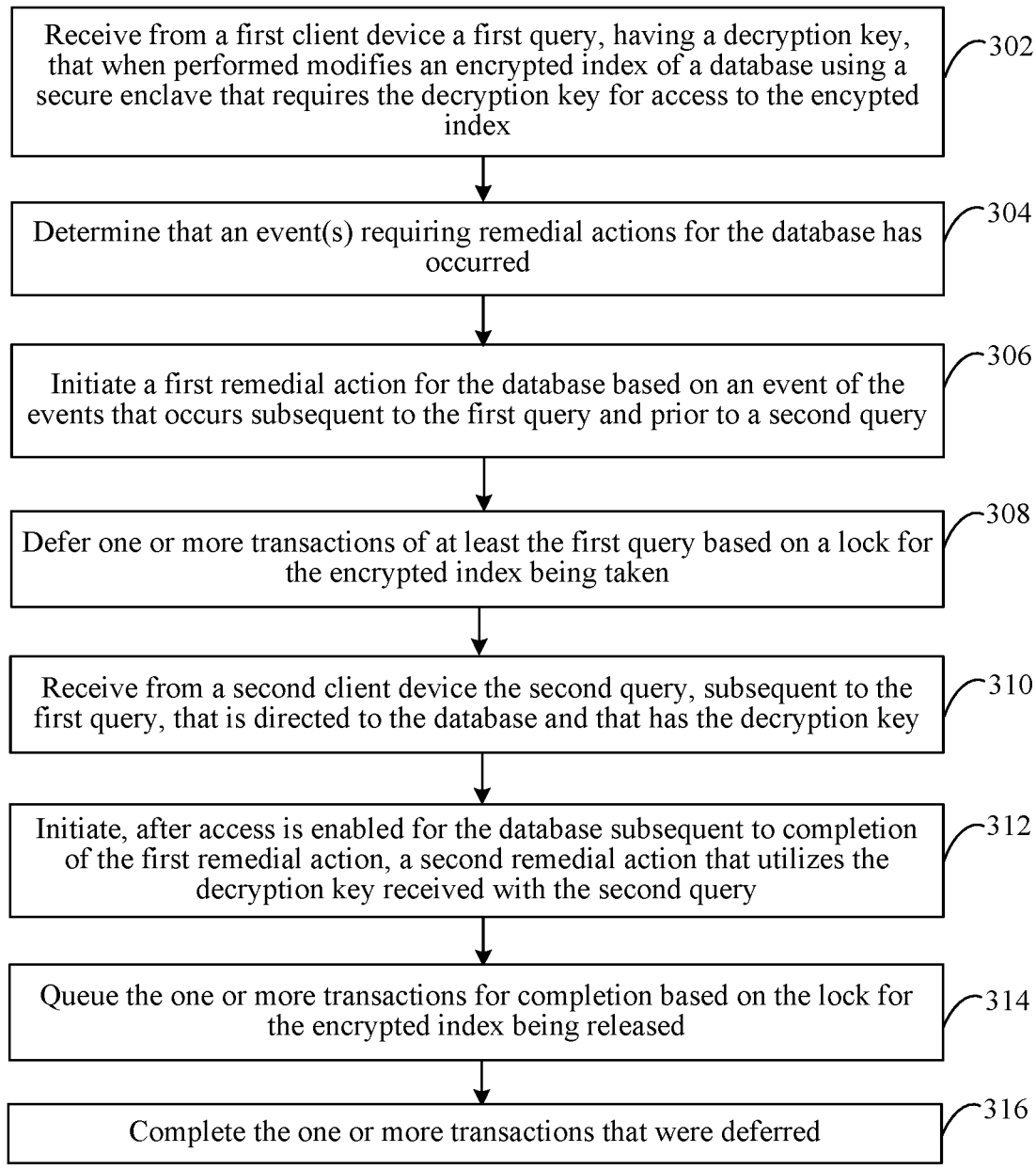
FIG. 3 shows a flowchart for database recovery for encrypted indexes, in accordance with an example embodiment.

As noted above for FIGS. 1 and 2, embodiments herein provide for database recovery for encrypted indexes. System 100 of FIG. 1 and system 200 of FIG. 2 may each be configured to perform such functions and operations. FIG. 3 will now be described. FIG. 3 shows a flowchart 300 for database recovery for encrypted indexes, according to example embodiments. System 200 and recovery manager 208 of computing device 202 in FIG. 2 may operate according to flowchart 300, in embodiments. Further structural and operational examples will be apparent to persons skilled in the relevant art(s) based on the following descriptions. Flowchart 300 is described as follows with respect to system 100 of FIG. 1 and system 200 of FIG. 2.

A user may desire to query a database (e.g., DB(s) 110 of FIG. 1) for data, such as encrypted data, and thus provide a query from a client device to a database host (e.g., from client device 106, across network 112 to DB host 102). For encrypted data, the request/query may include a decryption key to allow access to the data. DB host 102 may include the capability to access encrypted data of DB(s) 226 using secure enclaves, as exemplarily illustrated in FIG. 2 (enclave(s) 222). However, when events occur that disrupt the performance of these queries, recovery of the encrypted data and/or an encrypted index thereof may be required. Accordingly, recovery manager 108 and/or recovery manager 208 may be configured to perform database recovery for encrypted indexes.

Flowchart 300 begins at step 302. In step 302, a first query, having a decryption key, that when performed modifies an encrypted index of a database using a secure enclave that requires the decryption key for access to the encrypted index is received from a first client device. For example, recovery manager 208 of computing device 202 in system 200, which may be an embodiment of service host 102 of FIG. 1, may receive a first query from client device 106 at query manager 210. The user of the first client device may have permissions and a decryption key to access encrypted data in a DB of DB(s) 226 in system 200 which may take place in secure enclave(s) 222 to protect the data. As noted herein, transactions or operations of executing queries may modify an encrypted index associated with the data being accessed in DB(s) 226. When queries are received for access to data, such as encrypted data in DB(s) 226, query manager 210 may receive the query and initialize its execution and perform transactions thereof.

In step 304, it is determined that an event(s) requiring remedial actions for the database has/have occurred. For instance, event monitor 212 may be configured to determine occurrences of events that require remedial actions to be performed for the DB. During the execution of the query received in step 302, e.g., in the case of encrypted data/indexes, interruptions in the processing may occur that prevent completion of some query transactions. When these transactions do not complete for the encrypted data and/or the encrypted indexes, the data/indexes may become corrupted, incorrect, and/or unstable. As an example, when a DB or DB server/host crashes during access or execution of a query, such an event may cause transactions of the query to terminate early or not complete. These types of events may be monitored and determined by event monitor 212.

In step 306, a first remedial action for the database is initiated based on an event of the events that occurs subsequent to the first query and prior to the second query. For instance, event monitor 212 may be configured to initiate remedial actions responsive to events determined in step 304. In embodiments, remedial actions may include, without limitation, any combination of accelerated database recovery, restart, rollback, other recovery actions, backup, and/or the like. In some embodiments, one or more remedial actions may be performed, concurrently, partially concurrently, serially, etc., and in yet other embodiments, example different remedial actions may be combined into a single action.

Remedial actions may be performed subsequent to the first query processing being initialized, e.g., when an event occurs during the processing of the query that affects the encrypted index, and before a second query is later received that includes the decryption key.

In step 308, one or more transactions of at least the first query are deferred based on a lock for the encrypted index being taken. For example, deferment manager 214 may be configured to defer transactions of queries that are unable to complete, or that complete improperly, when the encrypted index is locked, e.g., by access manager 216. In embodiments, these deferred transactions may be saved or queued for holding while the encrypted index is locked. In embodiments, when another query is received after the encrypted index is locked, but before it is recovered and the lock is released, one or more transactions of the other query may also be deferred by deferment manager 214.

In step 310, a second query is received from a second client device, subsequent to the first query, that is directed to the database and that has the decryption key. For example, as noted above, recovery manager 208 of computing device 202 in system 200 may receive queries from client devices at query manager 210. In embodiments, the second client device may be the same as, or different from, the first client device in step 302. The user of the second client device may also have permissions and a decryption key to access the encrypted data in the DB of DB(s) 226 that was queried in step 302. The second query includes the decryption key required to access the encrypted data and the encrypted index of the encrypted data via secure enclave(s) 222. In embodiments, when transactions are deferred based on events, as described above, query manager 210 may provide the decryption key from the second query, when received, to event monitor 212.

In embodiments, transactions of the second query that affect the encrypted index may also be deferred until the encrypted index is recovered and unlocked as described below.

In step 312, a second remedial action that utilizes the decryption key received with the second query is initiated after access is enabled for the database subsequent to completion of the first remedial action. For instance, event monitor 212 may be configured to initiate the second remedial action, using the decryption key received in the second query in step 310, and perform the second remedial action via secure enclave(s) 222. That is, after the database is restarted as part of the first remedial action, and now having possession of the decryption key from the second query, the second remedial action is initiated and performed to gain access to the secure enclave, utilizing the decryption key, and perform the action on the encrypted index. It should be noted that the initiation of the second remedial action in step 312 may not be the first initiation of the second remedial action, in embodiments. For instance, the second remedial action may be repeatedly initiated after completion of the first remedial action. However, in order to recover the encrypted index, the decryption key is required, and the next initiation of the second remedial action after the receipt of the decryption key with the second query is described in step 312.

In step 314, the one or more transactions are queued for completion based on the lock for the encrypted index being released. For example, access manager 216 may release the lock held for the encrypted index, or portion thereof, and deferment manager 214 may be configured to queue the transactions deferred in step 306 for completion. The second remedial action of step 312, having utilized the decryption key, may recover, repair, etc., the encrypted index, and thus, deferred transactions affecting the encrypted index can be completed at least because the encrypted index is now recovered and the decryption key is now present.

Subsequently, in step 316, the now-queued transactions are no longer deferred and are processed to completion against the recovered encrypted index using the decryption key from the second query and the secure enclave.

Figure 4:
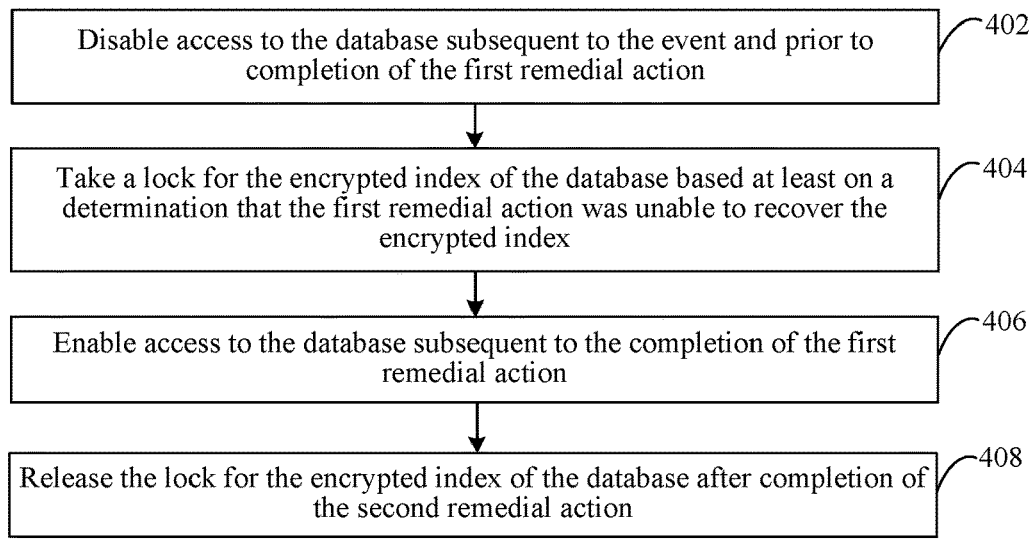
FIG. 4 shows a flowchart for database recovery for encrypted indexes, in accordance with an example embodiment.
Figure 5:
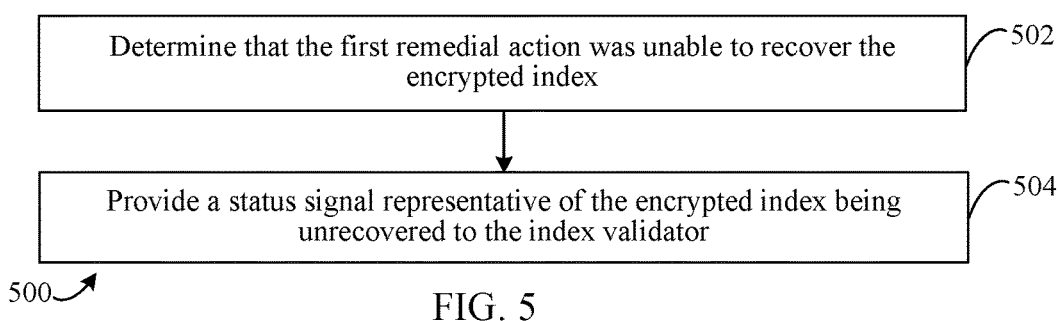
FIG. 5 shows a flowchart for database recovery for encrypted indexes, in accordance with an example embodiment.

FIGS. 4 and 5 will now be described. FIG. 4 shows a flowchart 400 and FIG. 5 shows a flowchart 500, each being for database recovery for encrypted indexes, according to example embodiments. System 200 and recovery manager 208 of computing device 202 in FIG. 2 may operate according to flowchart 400 and/or flowchart 500, in embodiments. Further structural and operational examples will be apparent to persons skilled in the relevant art(s) based on the following descriptions. Flowchart 400 and/or flowchart 500 may be embodiments of flowchart 300 of FIG. 3, and are described as follows with respect to system 100 of FIG. 1 and system 200 of FIG. 2.

Flowchart 400 of FIG. 4 begins at step 402. In step 402, access to the database is disabled subsequent to the event and prior to completion of the first remedial action. For example, access manager 216 may be configured to disable access to the DB of DB(s) 226 that was affected by the event in step 304 prior to completion of the first remedial action initiated in step 308 of flowchart 300. In one embodiment, when an event is determined to have occurred, a first remedial action may include a restart of the database followed by a recovery or rollback operation, or a backup operation prior to the restart. Accordingly, either before, during, or after the restart operation, access manager 216 may disable access to the database for the recovery or rollback to be performed. In some embodiments, access to the DB may be enabled, when the data in the DB is recovered, after the restart.

Referring now to FIG. 5, flowchart 500 begins with step 502. In step 502, it is determined that the first remedial action was unable to recover the encrypted index. For instance, event monitor 212 may be configured to determine that the encrypted index was not successfully recovered by the first remedial action. In embodiments, event monitor 212 may be able to determine that the encrypted index could not be recovered by determining that secure enclave(s) 222 did not have the decryption key after a portion or all of the first remedial action was performed, i.e., the encrypted index could not be accessed in the secure enclave due to absence of the decryption key. In other embodiments, event monitor 212 may make this determination based on query transaction completion indications.

In step 504, a status signal representative of the encrypted index being unrecovered is provided to the index validator. For example, responsive to the determination made in step 502 above, event monitor 212 may be configured to provide a status signal to index validator 218 that represents the unrecovered condition of the encrypted index.

Referring back to flowchart 400, in step 404, a lock is taken for the encrypted index of the database based at least on a determination that the first remedial action was unable to recover the encrypted index. For instance, recovery manager 208 may cause a lock to be taken on the encrypted index by access manager 216. The lock may be taken prior to, or as a portion of, the first remedial action that is initiated/performed, e.g., as in step 308 of flowchart 300 of FIG. 3.

In step 406, access to the database is enabled subsequent to the completion of the first remedial action. For example, access manager 216 may be configured to enable, or re-enable, access to the DB after the recovery or rollback portion of the first remedial action is completed and the DB is restarted. In this way, after the event is remediated, the DB may be available to users that desire access to data therein. At this stage, in embodiments, the encrypted index or portions thereof, may be unrecovered and locked, and thus be unavailable.

However, as noted above for flowchart 300, a second query that is subsequent to the first query, may be received from a second client device where the second query is also directed to the database and has the decryption key for access thereto. Accordingly, with the decryption key now available, the encrypted index may be accessed for performance of another remedial action to recover the encrypted index, e.g., as described with respect to step 312 above.

In step 408, the lock for the encrypted index of the database is released after completion of the second remedial action. For example, recovery manager 208 may cause a lock that was taken on the encrypted index to be released by access manager 216. That is, completion of the second remedial action initiated in step 312 of flowchart 300, using the decryption key from the second query, may recover the encrypted index. As the encrypted index is recovered, it is therefore available for completion of deferred transactions thereon, as in steps 314 and 316 of flowchart 300.

As described herein, events may occur during operations performed on a database and/or an encrypted index for data of the database which require that remedial actions be performed for recovery, restarting, rollback, backup, and/or the like. In some scenarios, the data/encrypted data of the database may be recovered/restored, but without a decryption key to access an encrypted index using a secure enclave, e.g., when a different secure enclave is utilized after a restart of the database, the encrypted index may be unrecoverable using the initial remedial actions.

Figure 6:
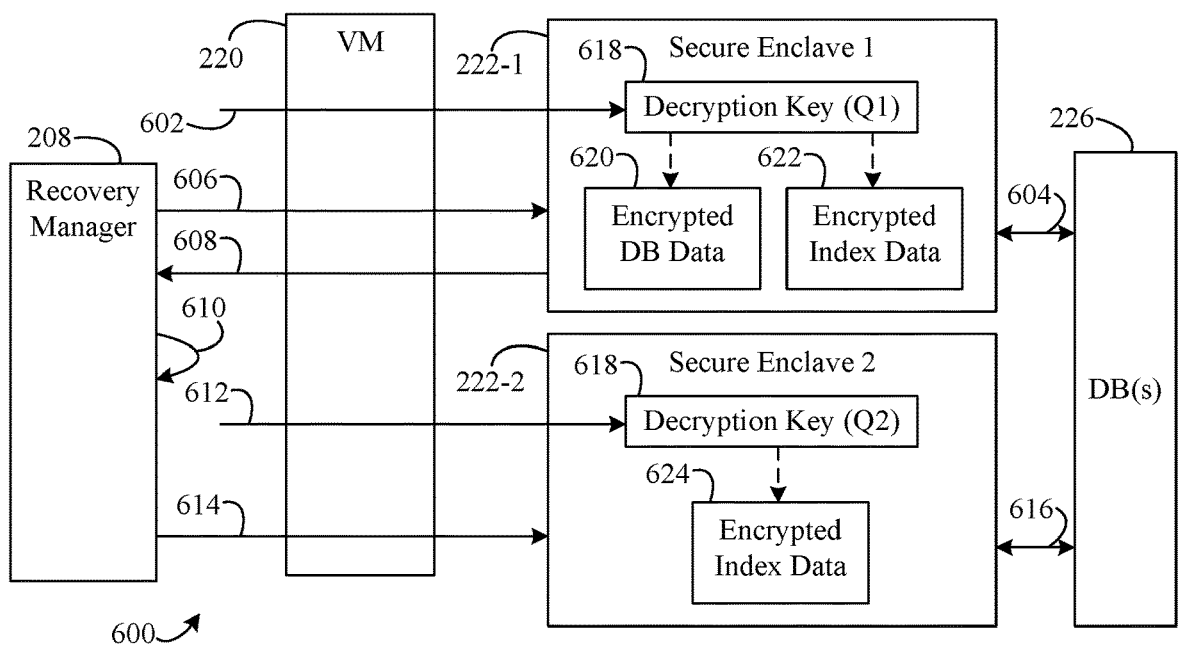
FIG. 6 shows a flow diagram for the system in FIG. 2 with respect to the flowchart of FIG. 3, in accordance with an example embodiment.

Turning now to FIG. 6, a flow diagram 600, for system 200 in FIG. 2 with respect to flowchart 300 of FIG. 3, for database recovery for encrypted indexes is shown, according to an example embodiment. That is, system 200 and recovery manager 208 of computing device 202 in FIG. 2 may operate according to flow diagram 600 which may be an embodiment of flowchart 300 of FIG. 3. Further structural and operational examples will be apparent to persons skilled in the relevant art(s) based on the following descriptions. Flow diagram 600 is described as follows.

Flow diagram 600 illustrates an example operation of recovery manager 208 of system 200 via a VM of VM(s) 220 for accesses to encrypted data of a DB of DB(s) 226 via a secure enclave 222-1 of enclave(s) 222. For example, in step 602, a client device as described herein may provide a decryption key 618 with a first query (Q1) as noted in step 302 of flowchart 300. Decryption key 618 may be provided to a secure enclave 222-1 of secure enclave(s) 222 via a communication session with the client device.

System 200, upon receiving the first query (Q1) may pull, or caused to be retrieved, queried data from a DB of DB(s) 226 or storage therefor, e.g., encrypted DB data 620 and/or encrypted index data 622 associated therewith, for processing in secure enclave 222-1 in step 604. Decryption key 618 enables the processing of encrypted DB data 620 and/or encrypted index data 622 in secure enclave 222-1 based on transactions of first query (Q1) provided in step 606. Results/data of such processing, e.g., via transactions of the first query (Q1), may be provided back from the DB server for the DB as an additional part of step 604 that completes after one or more portions of step 606.

As previously discussed, an event requiring remedial action to be taken for the DB of DB(s) 226 may occur during the processing of transactions of the first query (Q1) that alter encrypted index data 622. In embodiments, notifications of completed and/or uncompleted transactions may be provided to recovery manager 208 in step 608. In step 610, such an event may be determined to have occurred, e.g., by event monitor 212, whereupon transactions of the first query (Q1) are deferred, e.g., by deferment manager 214, and a first remedial action is initiated, e.g., by event monitor 212 to be performed by remediator 228, as described in steps 304-308 of flowchart 300. The determination of transactions to be deferred may be made based on the completion status of transactions provided to recovery manager 208 in step 608.

In embodiments where step 610 includes, as at least a part, a restart, a recovery, and/or the like, in a different secure enclave, or in the same secure enclave but where decryption key 618 is no longer present for any reason, the performance of the first remedial action may be unsuccessful with respect to encrypted index data 622. In various example scenarios, remedial actions may be performed one or more times in the background after a restart, etc., of the DB, in order to attempt recovery or the like of encrypted index 622.

As illustrated in flow diagram 600, another secure enclave, e.g., shown as a secure enclave 222-2 of enclave(s) 222, may be used after a restart, backup, copy, etc., of the DB after an event has occurred. Initially, decryption key 618 is not present in secure enclave 222-2 when it is initialized in memory (and during this time, the repeating of remedial action(s) may take place in the background). However, in embodiments and as shown for step 612, a second query (Q2) may be received from the client device, or from another client device, that includes decryption key 618 and that is directed to the DB associated with encrypted index data 622. The presence of decryption key 618 in secure enclave 222-2 allows processing/recovery action to be performed on encrypted index data 622, retrieved from DB(s) 226 in step 616. After performance of deferred transactions in step 614, generates recovered encrypted index data 624. Recovered encrypted index data 624 may then be provided back to storage as a part of step 616.

Figure 7:
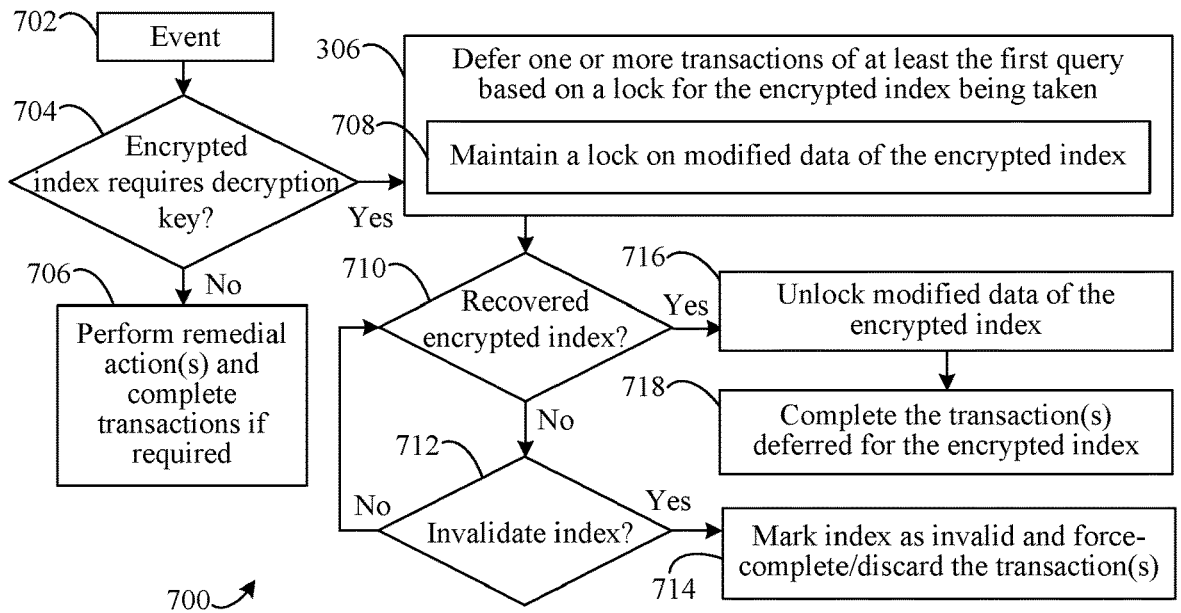
FIG. 7 shows a flow diagram for database recovery for encrypted indexes, in accordance with an example embodiment.

Regarding the deferment of query transactions and subsequent handling thereof, FIG. 7 shows a flow diagram 700 for database recovery for encrypted indexes, in accordance with an example embodiment. System 200 and recovery manager 208 of computing device 202 in FIG. 2 may operate according to flow diagram 700 which may be an embodiment of flowchart 300 of FIG. 3. Further structural and operational examples will be apparent to persons skilled in the relevant art(s) based on the following descriptions. Flow diagram 700 is described as follows, and begins at step 702.

In step 702, an event occurs and is determined to have occurred by event monitor 212 of recovery manager 208, as described herein. In some embodiments, deferment may not be desired at times, or is not available for system 200, however, as illustrated in flow diagram 700, deferment is enabled and a determination is made at step 704 as to whether or not the encrypted index for the DB on which operations were being performed during occurrence of the event in step 702 requires a decryption key for recovery. If not, flow diagram 700 proceeds from the determination of step 704 to step 706 where remedial action(s) are performed, and transactions are completed if required on the data/index.

If, however, a determination is made in step 704 that the encrypted index for the DB on which operations were being performed during occurrence of the event requires a decryption key for recovery, flow diagram 700 proceeds to defer one or more transactions as described above for step 306 in flowchart 300. In embodiments, step 306 may include an additional operation illustrated as step 708 of flow diagram 700. In step 708, a lock that was taken for the encrypted index may be maintained on modified data of the encrypted index. For example, data of the encrypted index that was affected by the event in step 702 is locked by access manager 216 of FIG. 2 and is not allowed to be modified by the DB system. In this way, the data in the encrypted index is protected for later recovery.

From step 306 and step 708, flow diagram 700 proceeds to step 710 where a determination is made as to whether the affected encrypted index has been recovered. In embodiments, step 710 may be performed after one or more remedial actions are initiated and performed, as described herein. If the encrypted index has not been recovered, step 712 may be performed. In step 712, it is determined whether the encrypted index should be invalidated. In embodiments, this determination may be based on one or more factors, such as but without limitation, a time out threshold and/or a log space threshold, or other mechanism(s) such as but not limited to DB administrator or user command for invalidation. For instance, database hosts may maintain logs for transactions of queries and data processed thereby, as well as logs for other operations/data in the database, and database hosts may also maintain timeout timers that require a recovery of an encrypted index to be completed during a specified period. If it is determined to invalidate the encrypted index, in step 714, the encrypted index is marked as invalid, and deferred transactions may be force-completed, e.g., with or without the encrypted index and/or discarded. If the determination indicates to not invalidate in step 712, step 710 may be repeated. In embodiments, the repetitive or iterative second remedial action to recover the encrypted index may be performed based on step 712.

In step 710, if it is determined that the encrypted index has been recovered, e.g., through a second remedial action such as but not limited to an index recovery action, flow diagram 700 continues to step 716 where modified data of the encrypted index is unlocked, e.g., the lock taken by access manager 216 may be released. Accordingly, access is again granted for transactions to modify the data of the now-recovered encrypted index. Subsequently, in step 718, deferred transactions for the encrypted index are performed and completed such that the encrypted index is up-to-date with respect to its associated data in the database.

The embodiments described above provide for, among other things, the ability to defer transactions affecting an encrypted index, responsive to an event that requires remediation, until the database is again accessible using a secure enclave and its decryption key is provided again to allow access/operations for encrypted data/indexes. Yet in some embodiments herein, remedial actions may include scenarios in which a database is restarted, recovered, backed-up, or copied to a DB host that does not support, or will not instantiate, secure enclaves for use by the DB. In such cases, alternate handling of affected encrypted indexes may be performed as exemplarily described with respect to FIGS. 8-10 below.

Figure 8:
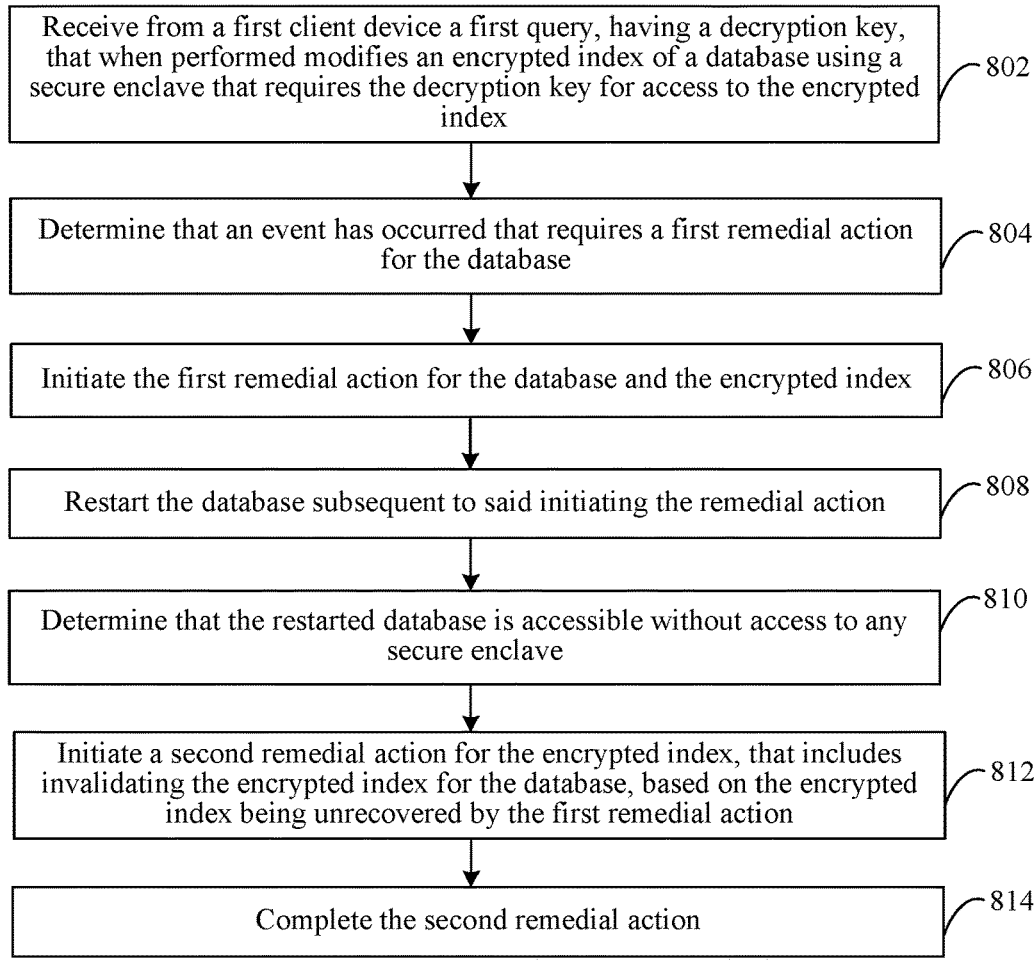
FIG. 8 shows a flowchart for database recovery for encrypted indexes, in accordance with an example embodiment.

That is, as noted above for FIGS. 1 and 2, embodiments herein provide for database recovery for encrypted indexes, and the following embodiments provide for the ability to handle affected encrypted indexes in DB instances without secure enclaves. System 100 of FIG. 1 and system 200 of FIG. 2 may each be configured to perform such functions and operations. FIG. 8 will now be described. FIG. 8 shows a flowchart 800 for database recovery for encrypted indexes, according to example embodiments. System 200 and recovery manager 208 of computing device 202 in FIG. 2 may operate according to flowchart 800, in embodiments. Further structural and operational examples will be apparent to persons skilled in the relevant art(s) based on the following descriptions. Flowchart 800 is described as follows with respect to system 100 of FIG. 1 and system 200 of FIG. 2. FIG. 8 and flowchart 800 are described as follows.

Flowchart 800 begins at step 802. In step 802, a first query, having a decryption key, that when performed modifies an encrypted index of a database using a secure enclave that requires the decryption key for access to the encrypted index is received from a first client device. For example, as noted above for step 302 of flowchart 300 in FIG. 3, recovery manager 208 of computing device 202 in system 200, which may be an embodiment of service host 102 of FIG. 1, may receive a first query from client device 106 at query manager 210. The user of the first client device may have permissions and a decryption key to access encrypted data in a DB of DB(s) 226 in system 200 which may take place in secure enclave(s) 222 to protect the data. As noted herein, transactions or operations of executing queries may modify an encrypted index associated with the data being accessed in DB(s) 226. When queries are received for access to data, such as encrypted data in DB(s) 226, query manager 210 may receive the query and initialize its execution and perform transactions thereof.

In step 804, it is determined that an event requiring a first remedial action for the database has occurred. For instance, as noted above for step 304 of flowchart 300 in FIG. 3, event monitor 212 may be configured to determine occurrences of events that require remedial actions to be performed for the DB. During the execution of the first query received in step 802, e.g., in the case of encrypted data/indexes, interruptions in the processing may occur that prevent completion of some query transactions. When these transactions do not complete for the encrypted data and/or the encrypted indexes, the data/indexes may become corrupted, incorrect, and/or unstable. As an example, when a DB or DB server/host crashes during access or execution of a query, such an event may cause transactions of the query to terminate early or not complete. These types of events may be monitored and determined by event monitor 212.

It should also be noted that while shown in FIG. 8 for brevity, flowchart 800 may include a deferment step to defer transactions of the first query that are directed to the encrypted index after the event is determined, as similarly described above in flowchart 300 for step 306 and as described below. For example, one or more transactions of at least the first query may deferred based on the encrypted index being marked as invalid by deferment manager 214, which may be configured to defer transactions of queries that are unable to complete, or that complete improperly. In embodiments, these deferred transactions may be completed without the encrypted index, or may be discarded.

In step 806, the first remedial action is initiated for the database and the encrypted index. For example, event monitor 212 may be configured to initiate remedial actions responsive to events determined in step 804. In embodiments, remedial actions may include, without limitation, any combination of accelerated database recovery, restart, rollback, other recovery actions, backup, and/or the like. In some embodiments, one or more remedial actions may be performed, concurrently, partially concurrently, serially, etc., and in yet other embodiments, example different remedial actions may be combined into a single action.

Remedial actions may be performed subsequent to the first query processing being initialized, e.g., when an event occurs during the processing of the query that affects the encrypted index, and before a second query is later received.

In step 808, the database is restarted subsequent to said initiating the remedial action. For instance, the remedial action may include a restart operation performed by remediator 228 of system 200 subsequent to initiation of the remedial action in step 806. In embodiments, a DB restart may be performed on the same DB host, or on another DB host, and in either case, the DB may be restarted in a section of memory 206 that is not capable of providing, or not initialized/allocated as, a secure enclave of enclave(s) 222. In these scenarios, alternate processing to that described in flowchart 300 of FIG. 3 is performed.

In step 810, it is determined that the restarted database is accessible without access to any secure enclave. For example, recovery manager 208 of system 200, e.g., via query manager 210 and/or event monitor 212, may determine that the database is restarted in the same DB host, or a different DB host, in a section of memory 206 that is not initialized/allocated as a secure enclave of enclave(s) 222. Restarting the DB without access to a secure enclave may be done based on the DB host not being configured to allocate memory portions as secure enclaves, or for any other reason.

In step 812, a second remedial action is initiated for the encrypted index, that includes invalidating the encrypted index for the database, based on the encrypted index being unrecovered by the first remedial action. For instance, event monitor 212 may be configured to initiate remedial actions responsive to determined events, and index validator 218 may be configured to invalidate the encrypted index. The second remedial action and/or the invalidation may be responsive to a determination that the encrypted index was unrecovered by the first remedial action and/or the determination made in step 810 described above that enclaves are not present for the database. Invalidating may include marking the encrypted index as invalid by index validator 218 for the database. Accordingly, index validator 218 may be configured to prevent any further access to the encrypted index in its current, improper state due to the event and first query transactions not completing properly.

In step 814, the second remedial action is completed. For example, the second remedial action may be completed by remediator 228. In embodiments, this completion may ignore or discard parts of the remedial action that recover or otherwise process data for the encrypted index. That is, data/information of the DB queried by the first query may be recovered, etc., while the encrypted index remains invalidated from step 812.

Figure 9:
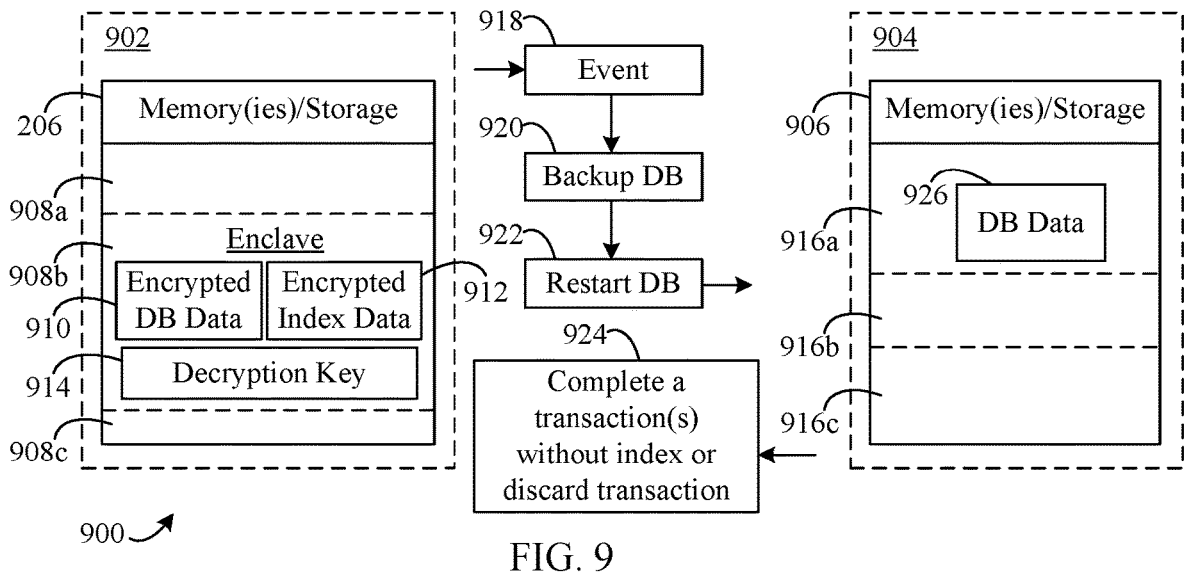
FIG. 9 shows a flow diagram for the system in FIG. 2 with respect to the flowchart of FIG. 8, in accordance with an example embodiment.

FIG. 9 continues this description in the context of flowchart 800 of FIG. 8. FIG. 9 shows a flow diagram 900 for the system in FIG. 2 with respect to flowchart 800, in accordance with an example embodiment. That is, system 200 and recovery manager 208 of computing device 202 in FIG. 2 may operate according to flow diagram 900 of FIG. 9 which may be an embodiment of flowchart 800 of FIG. 8. Further structural and operational examples will be apparent to persons skilled in the relevant art(s) based on the following descriptions. Flow diagram 900 is described as follows.

Flow diagram 900 illustrates an example operation of recovery manager 208 of system 200 and the restarting of a database (which was previously operating in association with a secure enclave during the occurrence of an event) without access to any secure enclave as described in flowchart 800. Flow diagram 900 shows a first DB host instance 902 that may be an embodiment of system 200 described above for flowchart 300. For example, first DB host instance 902 includes memory 206 having three illustrated memory allocations: a first allocation 908a, a second allocation 908b that may be initiated as a secure enclave ("secure enclave 908b"), as described herein, and a third allocation 908c. Secure enclave 908b may configured to receive, from a DB table/column, encrypted DB data 910 and, from an encrypted index, encrypted index data 912 that are processed using a decryption key 914, as described herein.

In embodiments, an event occurs and is determined in step 918 by event monitor 212 during the processing of encrypted DB data 910 and/or encrypted index data 912, as noted above in step 804 of flowchart 800 of FIG. 8. The determination of the event occurring may cause a first remedial action to be initiated (e.g., as in step 806 of flowchart 800), where the first remedial action includes a backup operation. In step 920 of flow diagram 900, the backup operation is performed for the database by remediator 228 of system 200. Subsequent to the backup operation being performed, the database may be restarted in step 922 as a portion of the first remedial action.

Flow diagram 900 also shows a second DB host instance 904 having a memory 906. Second DB host instance 904 and memory 906 may be the same DB host and memory as first DB host instance 902 and memory 206 but without secure enclave 908b allocated for processing of encrypted DB data 910 and or encrypted index data 912, or may be another DB host without a secure enclave allocated for database processing. For example, memory 906 includes three illustrated allocations (a first allocation 916a, a second allocation 916b, and a third allocation 916c), but these allocations are not initialized as secure enclaves.

In the illustrated embodiment of FIG. 9, the restarting of the database in step 922 may be performed with respect to second DB host instance 904 and memory 906. That is, the database is restarted in step 922 in association with memory 906 without a secure enclave. Accordingly, while DB data 926 of the database, which may be a representation of encrypted DB data 910 recovered by remedial actions, can be processed in memory 906, encrypted index data 912 that is modified in step 802 of flowchart 800 and/or as illustrated for secure enclave 908b of flow diagram 900, cannot be recovered by remedial actions using decryption key 914 in the absence of a secure enclave for memory 906. As described for flowchart 800, the encrypted index having encrypted index data 912 may be marked as invalid/invalidated, and in step 924 of flow diagram 900, any transactions that have not completed for the data of the database, and/or any transactions that may have been deferred, are completed without the encrypted index or are discarded.

Figure 10:
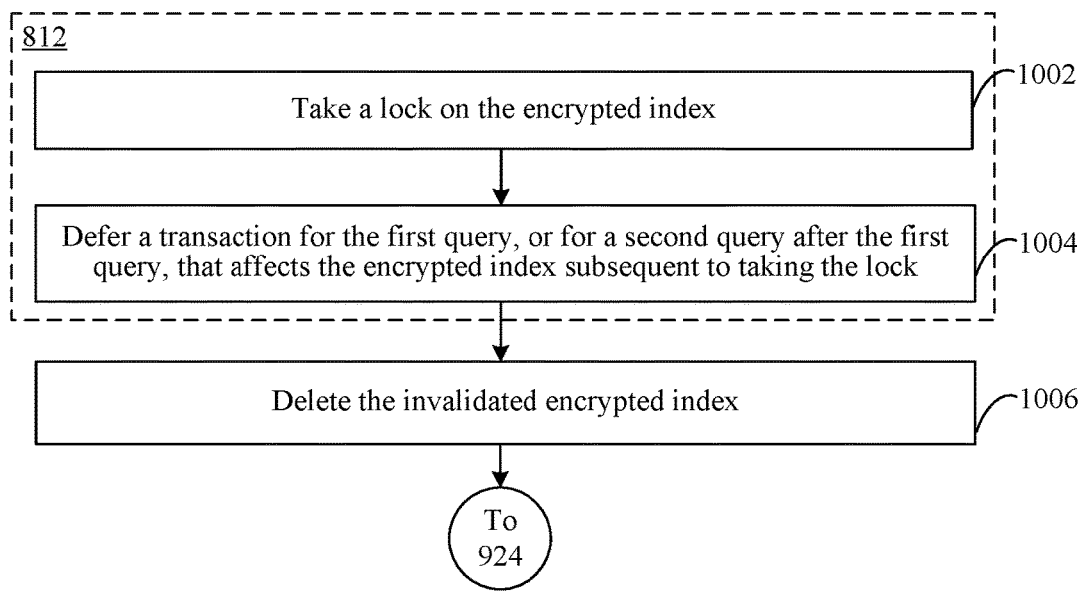
FIG. 10 shows a flowchart for database recovery for encrypted indexes, in accordance with an example embodiment.

FIG. 10 further continues this description in the context of flowchart 800 of FIG. 8 and flow diagram 900 of FIG. 9. FIG. 10 shows a flowchart 1000 for database recovery for encrypted indexes, in accordance with an example embodiment. System 200 and recovery manager 208 of computing device 202 in FIG. 2 may operate according to flowchart 1000 of FIG. 10 which may be an embodiment of flowchart 800 of FIG. 8 and/or flow diagram 900 of FIG. 9. Further structural and operational examples will be apparent to persons skilled in the relevant art(s) based on the following descriptions. Flowchart 1000 is described as follows and may begin as a furtherance of step 812 of flowchart 800.

In step 1002, a lock is taken on the encrypted index. For example, recovery manager 208 may cause a lock to be taken on the encrypted index by access manager 216. The lock may be taken as a part of step 812 of flowchart 800, that is, as a portion of the second remedial action that is performed prior to invalidating the encrypted index. In one example scenario, when a database is restarted, e.g., as in step 808 of flowchart 800 and/or step 922 of flow diagram 900, the system in which the database is restarted may not provide a secure enclave for use or may not be configured for secure enclaves. In such cases, when it is determined that the first remedial action did not recover the encrypted index, access manager 216 may take a lock to prevent access to the stale data in the encrypted index.

In step 1004, a transaction for the first query, or for a second query after the first query, that affects the encrypted index is deferred subsequent to taking the lock. For instance, deferment manager 214 may be configured to defer transactions that affect the encrypted index, including transactions that were not completed before the determined event or that were received after the restart of the database but prior to invalidating the encrypted index. The deferring of transactions may take place after the lock in step 1002 is taken.

In step 1006, the invalidated encrypted index is deleted. For example, index validator 218 of recovery manager 208 in system 200 may delete invalidated encrypted indexes. From step 1006, flowchart 1000 may proceed to step 924 of flow diagram 900 in FIG. 9. In some embodiments, step 1006 may be performed after step 924 of flow diagram 900, and step 924 may follow step 1004 of flowchart 1000.

Is should be noted that an encrypted index may be regenerated or rebuilt for the data in the database subsequent to its invalidation. Rebuilding may be performed in its entirety by system 200, or may be based on a later drop of the encrypted index by a user upon which the rebuilding is then based.

Thus, when a database having an invalidated encrypted index is restarted without the ability to utilize a secure enclave, the embodiments herein provide for flexible operational capabilities to invalidate the encrypted index and complete or discard any deferred transactions therefor. Without this ability, the database and/or DB host may become stuck with deferred transactions pending forever.

III. Example Mobile and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1 system 200 of FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 11:
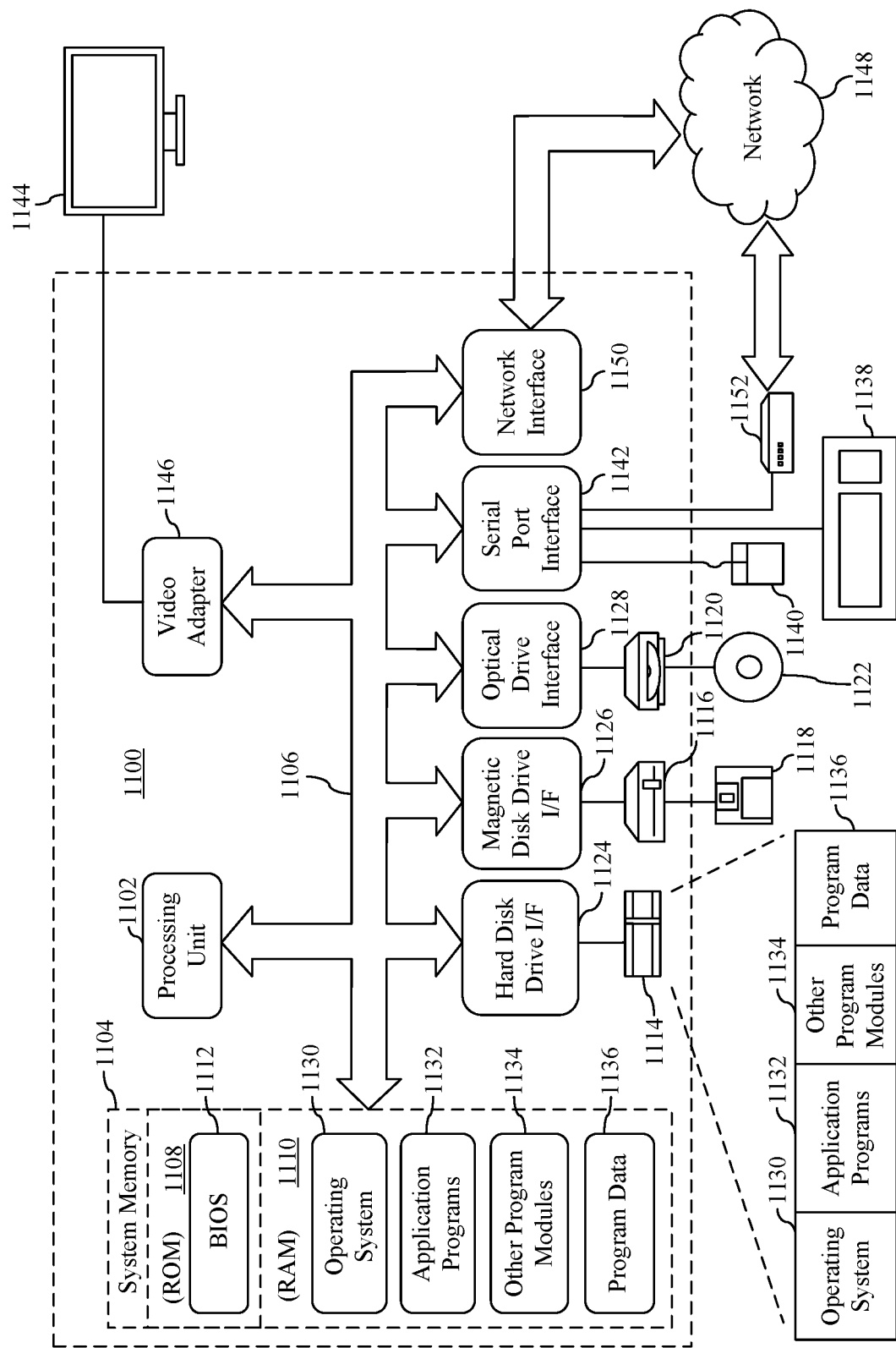
FIG. 11 shows a block diagram of an example computing device that may be used to implement embodiments.

FIG. 11 depicts an exemplary implementation of a computing device 1100 in which embodiments may be implemented. For example, embodiments described herein may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems and/or game consoles, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as but not limited to, system 100 of FIG. 1 and system 200 of FIG. 2, along with any components and/or subcomponents thereof, as well as the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for database recovery for encrypted indexes. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The described embodiments combine new methods of database recovery for encrypted indexes, e.g., associated with encrypted data of a database that his accessed utilizing secure enclaves. The embodiments described herein may utilize a combination of deferment for transactions targeting an encrypted index affected by events such as database crashes and procurement of decryption keys for secure enclaves, which was previously not available for software services and applications, much less for recover of invalidated, encrypted indexes.

It is also contemplated herein that an external key service may be utilized in addition to, or in lieu of, the deferring of transactions described herein. Another solution to the recovery problem is to introduce an external key service. Such a key service may be configured to send decryption keys to the secure enclave of a DB host when requested thereby. These requests may be made at any point during, or prior to, remedial actions being performed. Thus, secure enclave access to the requisite decryption keys may be provided in some embodiments without having to wait for a client device to send them. In some cases, the external key service may be used to complete recovery without, or as part of, deferring transactions. It is also contemplated that if a user drops the required decryption key making it unavailable for the key service, the deferred transaction embodiments noted above may still be performed.

Other embodiments may provide for the provision from the DB host, e.g., via a recovery manager, to the client device(s) of requests for decryption keys needed by the recovery manager to recover invalidated encrypted indexes. Similarly, on connection with client devices, e.g., after a restart, the DB host may receive decryption keys to be cached from a warm up script at the client devices.

Regarding invalidated encrypted indexes, when a restored backup of a database with an encrypted index is initiated in a system that is not enclave-enabled or otherwise does not have an enclave associated with the backup, the database recovery actions may end up holding on to locks for the encrypted index without the ability to clear them, which has a cascading effect of not letting log space be freed for the system. Even for an enclave-enabled system, a second client may not connect and provide the decryption key to the enclave, resulting in the same behavior as above, i.e., locks are maintained locks for the encrypted index. The embodiments herein allow for (a) declaration of the index as being invalid, and (b) forced recovery to complete and hence release locks by skipping the encrypted index. For example, in forced recovery, embodiments may utilize an index error table mechanism in the recovery code, e.g., in remediator 228 of system 200 in FIG. 2. This mechanism may be implemented in rollback operations, e.g., whenever an encrypted index page hits an exception, it tracks the allocation unit identifier of the encrypted index, and skips pages of the encrypted index subsequently. That is, the above mechanism forces recovery to complete and declares encrypted indexes as invalid, e.g., via index validator 218. It should be noted, however, that declaring an encrypted index as invalid during recovery may be avoided because recovery holds on to locks therefor, and declaring an encrypted index invalid requires a specific schema lock. Hence, encrypted indexes may be declared as invalid after recovery is complete, i.e., after release of all locks, according to embodiments. However, to prevent user transactions from using the index as it is being marked invalid, an "xlock" or equivalent may be taken on the database and/or index that is held until the operation is complete, and blockers are killed. Thus, some embodiments may provide that every encrypted index in the metadata list is marked invalid before opening the database to user connections.

Additional considerations are also provided herein for scenarios where the DB server/host crashes after recovery is complete, but before declaration of encrypted indexes as invalid. In these scenarios, recovery manager 208 of system 200 may skip recovery of the encrypted indexes intend to be invalidated, but may not mark them invalid, and as a result, clients may end up using the index, which could lead to corruption. Before force-recovery of an encrypted index, a metadata entry for the system stating that the encrypted index is about to be invalidated may be written, and the use of the encrypted index may not be permitted so long as the encrypted index is not invalidated and the above metadata entry is not cleared.

Embodiments may also be understood as handling database operations in the context of accelerated database recovery (ADR). In ADR, data in a database is versioned and the versions are persisted where all updates create new versions of the data. Versions corresponding to updates that are not committed are deemed "dirty," and when the DB host/server crashes due to an event in the middle of updates to the data, these "in flight" versions are also "dirty." During undo recovery, ADR ensures that the database is instantly available by ensuring that user transactions do not see the dirty versions of the data. These dirty versions are cleaned up as background tasks, and new user transactions can connect and update data even as the system is cleaning up the dirty versions in the background. The cleanup tasks, however, can be long-running and scenarios may exist where the DB host/server could crash in the middle of these tasks. Embodiments in consideration of ADR may also be in the context of non-clustered indexes, while clustered indexes may be handled in the context of a key service, as described herein.

ADR makes the database available even without access to the decryption keys. However, with ADR the background task that cleans up uncommitted versions performs logical reverts that requires decryption keys, and is undone using non-ADR, thus requiring the decryption keys. Additionally, undo operations of online index builds may also go through regular recovery, not ADR. Accordingly, the embodiments herein provide for modifying the existing bookkeeping of deferred transactions generally to signal that a missing decryption key is the root cause, and as similarly noted in the Sections above, any time decryption keys are sent to a secure enclave, tasks to complete deferred transactions may be appropriately scheduled.

The embodiments herein also provide the ability to enable handling of scenarios in which only a small number of columns in the database are encrypted, and decryption keys are not sent for an extended period of time (which may result in: some records being locked for an uncertain amount of time, blocking of schema updates as deferred transactions hold a lock on the database table, various administration operations being impossible to perform, e.g. log truncation, and/or the like). That is, embodiments repurpose the general concept of invalid encrypted indexes by enabling an undo recovery operation to take a table of encrypted indexes with errors and for every page, if it belongs to an encrypted index in the error table, skipping recovery of the encrypted index. As noted herein, skipping recovery may be based on a policy such as using a combination of timeout and log space, after which a task may be scheduled to forcibly complete deferred transactions and declare the encrypted index as invalid.

The additional examples and embodiments described in this Section may be applicable to examples disclosed in any other Section or subsection of this disclosure.

Embodiments in this description provide for systems, devices, and methods for database recovery for encrypted indexes. For instance, a system is described herein. The system may be configured and enabled in various ways for database recovery for encrypted indexes, as described herein. The system includes a processing system that includes one or more processors, and a memory that stores computer program instructions to be executed by the processing system. The computer program instructions include a query manager to, or configured to, receive from a first client device a first query, having a decryption key, that when performed modifies an encrypted index of a database using a secure enclave that requires the decryption key for access to the encrypted index, and receive from a second client device a second query, subsequent to the first query, that is directed to the database and that has the decryption key. The program instructions also include an event monitor to, or configured to, determine that events requiring remedial actions for the database have occurred, initiate a first remedial action for the database based on an event of the events that occurs subsequent to the first query and prior to the second query, and initiate, after access is enabled for the database subsequent to completion of the remedial action, a second remedial action that utilizes the decryption key received with the second query. The program instructions further include an event monitor to, or configured to, determine that events requiring remedial actions for the database have occurred, initiate a first remedial action for the database based on an event of the events that occurs subsequent to the first query and prior to the second query, and initiate, after access is enabled for the database subsequent to completion of the remedial action, a second remedial action that utilizes the decryption key received with the second query. The program instructions further include a deferment manager to, or configured to, defer one or more transactions of at least the first query or the second query based on a lock for the encrypted index being taken, and queue the one or more transactions for completion based on the lock for the encrypted index being released.

In an embodiment, the system includes an access manager to, or configured to, disable access to the database subsequent to the event and prior to completion of the first remedial action, take the lock for the encrypted index subsequent to the event based at least on a determination that the first remedial action was unable to recover the encrypted index, enable access to the database subsequent to the completion of the first remedial action, and release the lock for the encrypted index sequent to completion of the second remedial action. an index validator to, or configured to, mark the encrypted index as invalid in the database based at least on a determination that the first remedial action was unable to recover the encrypted index and mark the encrypted index as valid in the database after completion of the second remedial action.

In an embodiment of the system, the first remedial action includes an accelerated database recovery action performed without the enclave.

In an embodiment of the system, the first remedial action includes at least one of a restart of the database, the restart using another secure enclave that requires the decryption key for access to the encrypted index, a rollback action, or a recovery action.

In an embodiment of the system, the second remedial action includes an index recovery action that is configured to gain access to the encrypted index based on the decryption key received with the second query.

In an embodiment of the system, the event monitor is configured to determine that the first remedial action was unable to recover the encrypted index, and to provide a status signal representative of the encrypted index being unrecovered to an index validator configured to mark the encrypted index as invalid in the database based at least on a determination that the first remedial action was unable to recover the encrypted index.

In an embodiment of the system, the query manager is configured to perform, via a virtual machine instance, the second query on the database using another secure enclave and the decryption key received with the second query, and the second remedial action to recover the encrypted index.

A computer-implemented method is also described herein. The computer-implemented method may be for database recovery for encrypted indexes, as described herein. The computer-implemented method includes receiving from a first client device a first query, having a decryption key, that when performed modifies an encrypted index of a database using a secure enclave that requires the decryption key for access to the encrypted index, and determining that an event has occurred, requiring a remedial action for the database, prior to completion of the first query. The computer-implemented method also includes initiating a first remedial action for the database, determining that the encrypted index remains unrecovered after completion of the first remedial action, and deferring transactions of queries that affect the encrypted index subsequent to said determining that the event has occurred. The computer-implemented method further includes deferring one or more transactions of queries that affect the encrypted index subsequent to said determining that the event has occurred, initiating a second remedial action to recover the encrypted index, receiving from a second client device a second query, subsequent to the first query and said initiating the second remedial action, that is directed to the database and that has the decryption key, and completing the second remedial actions and the one or more transactions that were deferred.

In an embodiment of the computer-implemented method, initiating the second remedial action is performed in the background at least partially concurrently with the database being accessible and able to service queries.

In an embodiment of the computer-implemented method, the first remedial action includes at least one of a restart of the database, the restart using another secure enclave that requires the decryption key for access to the encrypted index, a rollback action, or a recovery action.

In an embodiment of the computer-implemented method, the second remedial action includes an index recovery action that is configured to gain access to the encrypted index based on the decryption key received with the second query.

In an embodiment of the computer-implemented method, deferring one or more transactions of queries includes at least one of maintaining a lock on modified data of the encrypted index, or deferring based at least on recovery of the encrypted index requiring the decryption key.

In an embodiment of the computer-implemented method, completing the one or more transactions includes completing the one or more transactions based on at least one of the recovered encrypted index that was recovered utilizing the decryption key received with the second query, or invalidating the encrypted index and forcing completion of the one or more transactions.

In an embodiment, the computer-implemented method further includes performing calls for the encrypted index to the database using the secure enclave via a virtual machine instance.

In an embodiment, the computer-implemented method further includes disabling access to the database subsequent to the event and prior to completion of the first remedial action, and enabling access to the database subsequent to the completion of the first remedial action.

A computer-readable storage medium having program instructions recorded thereon that, when executed by a processing device, perform a method, is also described. The method may be for database recovery for encrypted indexes, as described herein. The method includes receiving from a first client device a first query, having a decryption key, that when performed modifies an encrypted index of a database using a secure enclave that requires the decryption key for access to the encrypted index, and determining that an event has occurred that requires a first remedial action for the database. The method also includes initiating the first remedial action for the database and the encrypted index, and determining that the database is restarted and accessible without access to any secure enclave. The method further includes initiating a second remedial action for the encrypted index, that includes invalidating the encrypted index for the database, based on the encrypted index being unrecovered by the first remedial action, and completing the second remedial action.

In an embodiment of the computer-readable storage medium, the method includes initiating a restore operation on the database as a part of the first remedial action prior to the restarting.

In an embodiment of the computer-readable storage medium, the initiating a second remedial action includes, prior to invalidating the encrypted index, taking a lock on the encrypted index and deferring a transaction for the first query, or for a second query after the first query, that affects the encrypted index subsequent to taking the lock.

In the embodiment of the computer-readable storage medium, the method also includes completing the transaction without the encrypted index subsequent to said invalidating the encrypted index, or discarding the transaction.

In an embodiment of the computer-readable storage medium, the method includes deleting the invalidated encrypted index.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:
1. A system comprising:
 a processing system that includes one or more processors; and a memory that stores computer program instructions that are executable by the processing system, the computer program instructions including:
  a query manager configured to:
    receive from a first client device a first query, having a decryption key, that when performed modifies an encrypted index of a database using a secure enclave that requires the decryption key for access to the encrypted index; and
    receive from a second client device a second query, subsequent to the first query, that is directed to the database and that has the decryption key;
  an event monitor configured to:
    determine that events requiring remedial actions for the database have occurred;
    initiate a first remedial action for the database based on an event of the events that occurs subsequent to the first query and prior to the second query, the first remedial action comprising an attempt to recover the encrypted index;
    determine, after completion of the first remedial action, that the first remedial action was unsuccessful in recovering the encrypted index; and
    initiate, after access is enabled for the database subsequent to completion of the first remedial action, a second remedial action that utilizes the decryption key received with the second query; and
  a deferment manager configured to:
    defer one or more transactions of at least the first query or the second query based on a lock for the encrypted index being taken; and
    queue the one or more transactions for completion based on the lock for the encrypted index being released.

2. The system of claim 1, further comprising:
an access manager configured to:
  disable access to the database subsequent to the event and prior to completion of the first remedial action;
  take the lock for the encrypted index subsequent to the event based at least on the determination that the first remedial action was unsuccessful in recovering the encrypted index;
  enable access to the database subsequent to the completion of the first remedial action; and
  release the lock for the encrypted index subsequent to completion of the second remedial action.

3. The system of claim 1, wherein the first remedial action includes an accelerated database recovery action performed without the enclave.

4. The system of claim 1, wherein the first remedial action further comprises at least one of:
a restart of the database, the restart using another secure enclave that requires the decryption key for access to the encrypted index, or a rollback action.

5. The system of claim 1, wherein the second remedial action comprises an index recovery action that is configured to gain access to the encrypted index based on the decryption key received with the second query.

6. The system of claim 1, wherein the event monitor is configured to:
provide a status signal representative of the encrypted index being unrecovered to an index validator configured to mark the encrypted index as invalid in the database based at least on the determination that the first remedial action was unsuccessful in recovering the encrypted index.

7. The system of claim 1, wherein the query manager is configured to perform via a virtual machine instance:
  the second query on the database using another secure enclave and the decryption key received with the second query; and
  the second remedial action to recover the encrypted index.

8. A computer-implemented method, comprising:
receiving from a first client device a first query, having a decryption key, that when performed modifies an encrypted index of a database using a secure enclave that requires the decryption key for access to the encrypted index;
determining that an event has occurred, requiring a remedial action for the database, prior to completion of the first query;
initiating a first remedial action for the database to attempt recovery of the encrypted index;
determining, after completion of the first remedial action, the first remedial action was unsuccessful in recovering the encrypted index;
deferring one or more transactions of queries that affect the encrypted index subsequent to said determining that the event has occurred;
initiating a second remedial action to recover the encrypted index;
receiving from a second client device a second query, subsequent to the first query and said initiating the second remedial action, that is directed to the database and that has the decryption key; and
completing the second remedial actions and the one or more transactions that were deferred.

9. The computer-implemented method of claim 8, wherein said initiating the second remedial action is performed in the background at least partially concurrently with the database being accessible and able to service queries.

10. The computer-implemented method of claim 8, wherein the first remedial action includes at least one of:
a restart of the database, the restart using another secure enclave that requires the decryption key for access to the encrypted index, or a rollback action.

11. The computer-implemented method of claim 8, wherein the second remedial action comprises an index recovery action that is configured to gain access to the encrypted index based on the decryption key received with the second query.

12. The computer-implemented method of claim 8, wherein said deferring one or more transactions of queries comprises at least one of:
maintaining a lock on modified data of the encrypted index; or
deferring based at least on recovery of the encrypted index requiring the decryption key.

13. The computer-implemented method of claim 12, wherein said completing the one or more transactions comprises completing the one or more transactions based on at least one of:
the recovered encrypted index that was recovered utilizing the decryption key received with the second query; or
invalidating the encrypted index and forcing completion of the one or more transactions.

14. The computer-implemented method of claim 8, further comprising:
performing calls for the encrypted index to the database using the secure enclave via a virtual machine instance.

15. The computer-implemented method of claim 8, further comprising:

disabling access to the database subsequent to the event and prior to completion of the first remedial action; and enabling access to the database subsequent to the completion of the first remedial action.

16. A computer-readable storage medium having program instructions recorded thereon that, when executed by a processing device, perform a method, the method comprising:

receiving from a first client device a first query, having a decryption key, that when performed modifies an encrypted index of a database using a secure enclave that requires the decryption key for access to the encrypted index;

determining that an event has occurred that requires a first remedial action for the database;

initiating the first remedial action for the database and the encrypted index to attempt recovery of the encrypted index;

after completion of the first remedial action, determining that the database is restarted and is without access to any secure enclave;

initiating a second remedial action for the encrypted index, that includes invalidating the encrypted index for the database, based on the first remedial action being unsuccessful in recovering the encrypted index; and completing the second remedial action.

17. The computer-readable storage medium of claim 16, wherein the method comprises:

initiating a restore operation on the database as a part of the first remedial action prior to said restarting.

18. The computer-readable storage medium of claim 16, wherein said initiating a second remedial action comprises, prior to invalidating the encrypted index:

taking a lock on the encrypted index; and deferring a transaction for the first query, or for a second query after the first query, that affects the encrypted index subsequent to taking the lock.

19. The computer-readable storage medium of claim 16, wherein the method comprises:

completing the transaction without the encrypted index subsequent to said invalidating the encrypted index; or discarding the transaction.

20. The computer-readable storage medium of claim 16, wherein the method comprises deleting the invalidated encrypted index.

* * * * *